Figure 1:
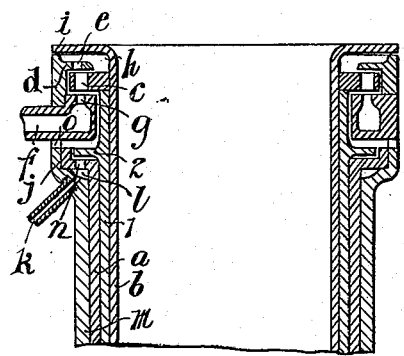

S. Z. DE FERRANTI.
AIR BEARING FOR HIGH SPEEDS.
APPLICATION FILED AUG. 13, 1906.

930,851.

Patented Aug. 10, 1909.

ATTEST.
Bent McStahl.
Ewd R. Tolson.

INVENTOR.
Sebastian Ziani de Ferranti.
By Spear, Middleton, Donaldson & Spear
Atty's.

UNITED STATES PATENT OFFICE.

SEBASTIAN ZIANI DE FERRANTI, OF HAMPSTEAD, LONDON, ENGLAND.

AIR-BEARING FOR HIGH SPEEDS.

No. 930,851.          Specification of Letters Patent.          Patented Aug. 10, 1909.

Application filed August 13, 1906. Serial No. 330,473.

*To all whom it may concern:*

Be it known that I, SEBASTIAN ZIANI DE FERRANTI, a subject of the King of Great Britain and Ireland, and residing at 31 Lyndhurst road, Hampstead, London, N. W., England, have invented certain new and useful Improvements in and Relating to Air-Bearings for High Speeds, of which the following is a specification.

This invention relates to improvements in air bearings for high speeds and is especially applicable to spinning, doubling and like machines.

In the specifications of my patent applications Nos. 260,120 and 272,560, I have described certain improvements in air bearings and their application to textile machinery which have for their main object the obtaining of much higher rates of production than are now common in textile work.

Now the present invention has for its object to provide improved air bearings for working at high speeds.

My improvements consist in the following elements: I have found in the application of air bearings in textile machinery for high speeds that the power absorbed under such conditions increases more rapidly than the square of the speed. These bearings are generally of the type which rotate about a vertical axis and are so constructed that a film of air of very small dimensions maintains the rotating part centrally within the standing bearing. As the axis of rotation is vertical, and the drive of such a type as to give practically a uniform torque, it follows that the parts have very little load to carry other than their own weight, and that due to the drag of the material. Under these conditions the power absorbed becomes a serious factor in the efficiency of the bearing especially when working at such high speeds. According to my first improvement, I effect a substantial increase in the efficiency of the bearing by interposing one or more running bearing parts between the stationary and the highest speed rotating part of the bearing.

In an air bearing constructed in accordance with my first improvement a further advantageous result may be effected by causing the interposed running bearing part to be supported in an air borne manner and arranged preferably in series with respect to the supporting medium for the highest speed rotating part. This I provide for according to my second improvement by forming flanges on the running bearing parts, which flanges are so proportioned and situated as to be acted on by any convenient air pressure to attain the desired result. (a) In applying my second improvement to a ring flier or the like, as described in my applications Nos. 260120 and 272560, and having the turbine element at the top, I preferably dispose the flanges of the intermediate running part below the turbine element, and lead a separate supply of air under pressure to support the weight of the intermediate running bearing parts. (b) While in a ring flier of the type above described and having the turbine elements situated at the bottom, I preferably allow the exhaust of the turbine to operate on the flanges of all the running parts to support the weight thereof.

In carrying my first and second improvements into effect according to one modification, I do not rotate the running part inside a standing bearing, but I rotate it inside one or more similar tube parts capable of rotation. Where the axis of these parts is vertical, it is necessary to take up the dead weight of these intermediate rotating bushes as well as taking the dead weight of the main high speed part. I accomplish this according to one method by means of an air pressure under flanges which are formed on the bushed and main part. A small amount of air at say about one pound pressure is allowed to leak in below the lowest flange. This raises the lowest flange, and then, through the rise of this flange, escapes to a chamber formed between the lowest flange and the next one above it, acting in a similar way on this flange and on any successive flanges of the rotating parts of the bearing.

When the several parts forming the bearing and the main rotating part have their dead weight taken, and the main rotating part is for example driven around by a turbine, the highest speed will of course be given to the main rotating part and the other one or more parts will rotate, but at a speed less than that of the main rotating part. They will range themselves in speed according to the resistance to motion of the several parts. In this way very high speeds may be obtained with exceedingly small power, as the surface speed between any two parts is thus kept quite moderate. Where elastic fluid bearings using this principle are employed, and which have their axis vertical, it is necessary to provide some mechanical means to limit the end motion of the intermediate running bearing parts; and this may be done by means of balancing surfaces fed with elastic fluid at each end of the intermediate running bearing parts.

Figure 2:
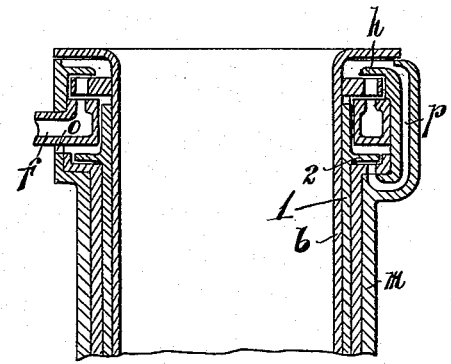
Figure 3:
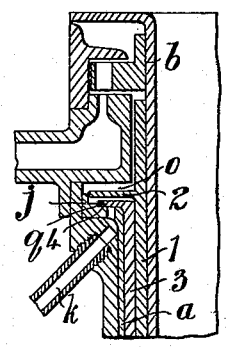
Figure 4:
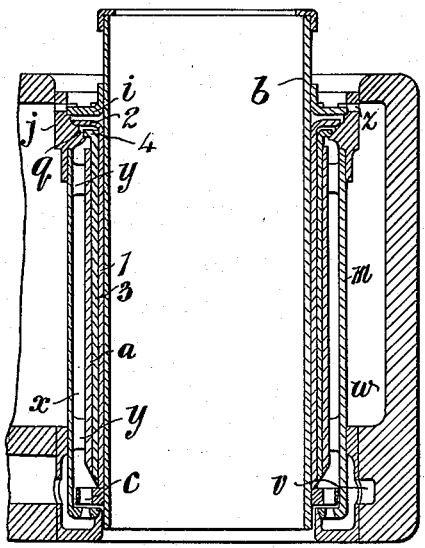
Figure 5:
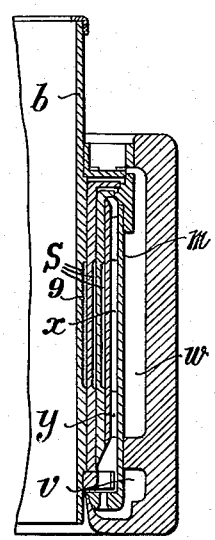

Referring now to the accompanying drawings which illustrate my invention and form part of my specification, Figure 1 is a sectional elevation of a turbine-driven ring flier provided with bearings constructed according to my invention. Fig. 2 shows a modified arrangement to that shown in Fig. 1. Fig. 3 shows a detail view of a ring flier similar to that shown in Fig. 1 but provided with multiple running bearing parts. Fig. 4 illustrates one method of applying my invention to a ring flier having the turbine element at the bottom. Fig. 5 shows a modified arrangement to that shown in Fig. 4.

In the drawings, which are of a diagrammatic nature, where desirable, similar parts are denoted by the same reference symbols.

In applying my improvements by way of example to a turbine-driven ring flier as described in my applications Nos. 260120 and 272560 in which the turbine element is situated at its upper extremity according to one modification I insert a running bearing part, 1, between the stationary bearing part, $a$, and the ring flier, $b$. The ring flier, $b$, carries turbine blades, $c$, at its upper extremity which are shielded by a ring, $d$, having holes, $e$, disposed therein at suitable intervals to allow a free passage for the exhaust. The ring, $d$, incloses and shields the blades, $c$, as much as possible so as to reduce to a minimum the losses due to the fanning action of the blades. This method of reducing the fanning action of the blades forms no part of the present invention and is not herein claimed. The air which forms the working fluid is supplied by the pipe, $f$, and is discharged through nozzles, $g$, to operate on the turbine blades, $c$. The exhaust from the blades passes to a chamber, $h$, where it acts on the flange, $i$, of the ring flier to support the dead-weight thereof. The action of the air on the flange, $i$ causes it to be lifted sufficiently so as to allow the escape of the working fluid either directly to the atmosphere or to the exhaust trunk according to the construction of the machine.

It will thus be seen that the part, $b$, has its dead weight supported on a cushion of elastic fluid. In order to support the running bearing part 1 in a similar manner I cause a flange, 2, to be formed on it which flange rests in a seat, $j$, formed on the dished top of the stationary part, $a$. Air under a small pressure, say $\frac{1}{2}$ lb. per square inch, is introduced by a pipe, $k$, into an annular chamber, $l$, situated between the stationary part, $a$, and the casing, $m$, and is led underneath the flange, 2, by holes, $n$, formed at suitable intervals in the stationary part, $a$. The operation of the air on the flange, 2, causes it to be lifted and supported and at the same time allows the air to escape to the exhaust or to the atmosphere by the annular passage, $o$.

The amount of diametrical clearance between the air bearing parts herein described should be of the order for air bearings which I have described in my patent specifications above cited, so that a bearing constructed as above in addition to having all its bearing surfaces air lubricated has the dead-weight of the rotating parts supported on a cushion of elastic fluid. Suitable precautions should also be taken with respect to the condition of the air which will also be found in the above cited specifications.

A modified arrangement to the above described is shown in Fig. 2. In this case the exhaust from the turbine is utilized to support the dead-weight of all the rotating parts. In the form shown, ducts, $p$, arranged at suitable intervals around the circumference of the casing, $m$, lead the turbine exhaust from the chamber, $h$, to the supporting flange, 2, of the part, 1, and passes to the exhaust by the passage, $o$, in a similar manner to that described with reference to Fig. 1.

In some circumstances I find it desirable to insert more than one running bearing part and in Fig. 3 I have shown an example of a bearing provided with two running bearing parts. In this case the running bearing parts, 1 and 3, are provided with flanges, 2 and 4, which rest in stepped seats, $j$ and $q$, formed on the stationary part, $a$. The air for supporting the bearing parts, 1 and 3, is supplied by the pipe, $k$, and passes to the flange, 4, which it lifts and suports, the operation of lifting the flange, 4, introducing the air below the flange, 2, upon which it acts in a similar manner finally escaping to the exhaust by the annular passage, $o$. The ring flier, $b$, is supported by the exhaust from the turbine in the manner hereinbefore described. These running bearing parts may in some cases extend for the greater part of the stationary bearing while in other cases they may be disposed at each end of the stationary part.

In applying my improvements to a ring flier having the turbine element situated at its lower extremity I prefer the arrangement shown in Figs. 4 and 5.

Referring to Fig. 4 the casing, $m$, is directly inserted in the supply and exhaust working fluid trunks, $v$ and $w$, and the working fluid after operating on the turbine blades, $c$, is led through a passage, $x$, formed between the casing, $m$, and the stationary part $a$, lugs, $y$, being disposed at convenient positions on the casing, $m$, to preserve the relative positions of the parts. Running bearing parts, 1 and 3, are inserted between the stationary part, $a$, and the flier, $b$, the flanges, 2 and 4, of which rest on stepped seats, $j$ and $q$, formed on the casing, $m$. The flier, $b$, is also provided with a flange, $i$, which likewise rests on a seat formed on the casing, $m$. The three supporting flanges, 2, 4 and $i$, are thus arranged in series with respect to the supporting medium, which in this case is the turbine exhaust, and are lifted in succession and supported, the lifting operation of one of the series of flanges introducing the supporting fluid to the next of the series until it finally escapes to the exhaust trunk by ports, $z$, opened by the lifting of the flange, $i$.

In Fig. 5 an arrangement showing enlarged clearance spaces, $s$, is illustrated but in other respects it is similar to that shown in Fig. 4 and already described with reference thereto.

It is advisable that the high speed rotating part should be rotated by an electro motor, turbine or other substantially "pure couple" drive. By a pure "couple drive" I wish to be understood a drive of the type in which the unbalanced component in a radial direction is small, so as to prevent as far as possible any chance of rupture of the air films between the various bearing parts owing to excessive side thrust occasioned by the nature of the drive.

So long as the unbalanced component in a radial direction with respect to the axis of rotation is small as in the case of a turbine actuated by air under small pressure I find that it is not essential to provide nozzles symmetrically disposed with respect to the axis of the turbine and the nozzles may be disposed at one side only without rupturing the air films between the various bearing parts.

I wish it to be understood that although I have illustrated and described the application of my invention to ring fliers in which the rotational axis is in the vertical plane, I do not in any way limit myself to such application as my invention is of general application and can be advantageously applied to increase the efficiency of other high speed rotating parts having their axis of rotation in the horizontal or other plane.

Having now particularly described and ascertained the nature of my said invention, and in what manner the same is to be performed, I declare that what I claim is:—

1. An air bearing having in combination a bearing member; a high speed rotatable member; one or more running members disposed between said bearing and said high speed rotatable members together with air lubricated surfaces on co-acting bearing portions of said members.

2. An air bearing having in combination a bearing member, a high speed rotatable member; one or more running members disposed between said bearing and said high speed rotatable members, air lubricated surfaces on co-acting bearing portions of said members together with means for supporting dead weight of certain of said members.

3. An air bearing having in combination a bearing member; a high speed rotatable member, one or more running members disposed between said bearing and said high speed rotatable members; air lubricated surfaces on co-acting bearing portions of said members together with elastic fluid means for supporting dead weight of certain of said members.

4. An air bearing having in combination, a stationary member; a high speed rotatable member; a turbine mounted on said high speed rotatable member; one or more running members disposed between said stationary and said high speed rotatable members, air lubricated surfaces on co-acting bearing portions of said members together with means for supporting dead weight of certain of said members, said means including the exhaust fluid from said turbine.

5. An air bearing having in combination a bearing member; a high speed rotatable member; one or more running members disposed between said bearing and said high speed rotatable members, air lubricated surfaces on co-acting bearing portions of said members together with means for imparting a pure couple drive to said high speed rotatable part.

6. An air bearing having in combination a stationary member; a high speed rotatable member; one or more running members disposed between said stationary and said high speed rotatable members, air lubricated surfaces on co-acting bearing portions of said members, means for supporting dead weight of certain of said members together with a pure couple drive for said high speed rotatable member.

7. In a spinning, twisting or doubling machine, the combination of a motor-carrying twisting member; an air-bearing member co-acting with said motor-carrying twisting member together with one or more intermediate running members disposed between said twisting member and said air-bearing member together with means for supporting dead weight of certain said members.

8. In a spinning, twisting or doubling machine, the combination of an operative rotatable twisting member; a bearing member; one or more running members disposed between said twisting and bearing members together with air-lubricated surfaces on coacting bearing portions of said members.

Dated this 4th day of August 1906.
In testimony whereof, I affix my signature in presence of two witnesses.

SEBASTIAN ZIANI DE FERRANTI.

Witnesses:
CHAS. N. DANIELS,
LUTHER J. PARR.